US012596710B1

(12) United States Patent
Fuerst et al.

(10) Patent No.: US 12,596,710 B1
(45) Date of Patent: Apr. 7, 2026

(54) AI-ASSISTED NATURAL LANGUAGE REQUEST TRANSFORMATION WITH REDUCED COGNITIVE LOAD

(71) Applicant: SAP SE, Walldorf (DE)

(72) Inventors: Karl Fuerst, Wiesloch (DE); Daniel Steinberg, Heidelberg (DE); Erika Fonseca de Lima, Heidelberg (DE); Muamer Rovcanin, Viernheim (DE); Pranadharthi Haran Sathiyaseelan, Bruchsal (DE); Allan Felipe Brochier dos Santos da Silva, St. Leon-Rot (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/983,047

(22) Filed: Dec. 16, 2024

(51) Int. Cl.
G06F 16/2452 (2019.01)
(52) U.S. Cl.
CPC .............................. G06F 16/24522 (2019.01)
(58) Field of Classification Search
CPC ................................................. G06F 16/24522
See application file for complete search history.

(56) References Cited

U.S. PATENT DOCUMENTS

| | | | |
|---|---|---|---|
| 11,222,013 B2 | 1/2022 | de Lima et al. | |
| 11,403,286 B2 | 8/2022 | Bhutada et al. | |
| 11,995,073 B2 | 5/2024 | Lee et al. | |
| 2024/0362497 A1* | 10/2024 | Grenader ............. | G06N 3/0455 |

OTHER PUBLICATIONS

Qu, Before Generation, Align it! A Novel and Effective Strategy for Mitigating Hallucinations in Text-to-SQL Generation, pp. 1-16, May 24, (Year: 2024).*

* cited by examiner

*Primary Examiner* — Albert M Phillips, III
(74) *Attorney, Agent, or Firm* — Klarquist Sparkman, LLP

(57) ABSTRACT

Strategic actions can be performed before and during runtime to reduce the cognitive load of an LLM during transformation of a natural language request into a refined structured request. During a development stage, object-type-specific examples are collected; a given example includes an example natural language request and a corresponding example structured request representing a desired LLM output for the example natural language request. The examples can include function calls to train the LLM to include function calls in its output to delegate certain sub-tasks. At runtime, a prompt generation module generates a prompt for a natural language request which includes the natural language request, one or more of the examples, and a data model. The prompt is input to the LLM which produces a preliminary structured output including one or more function calls. The post-processing module executes the function(s) and generates a refined structured output based on the execution results.

20 Claims, 8 Drawing Sheets

RECEIVE A NATURAL LANGUAGE REQUEST
210

GENERATE A PROMPT FOR AN LLM BASED ON THE NATURAL LANGUAGE REQUEST, WHEREIN THE PROMPT COMPRISES A DATA MODEL, ONE OR MORE EXAMPLES, AND THE NATURAL LANGUAGE REQUEST, WHEREIN A GIVEN EXAMPLE OF THE ONE OR MORE EXAMPLES COMPRISES AN EXAMPLE NATURAL LANGUAGE REQUEST AND A CORRESPONDING EXAMPLE STRUCTURED REQUEST, AND WHEREIN THE EXAMPLE STRUCTURED REQUEST COMPRISES A CALL TO A FUNCTION
220

SUBMIT THE PROMPT TO THE LLM
230

RECEIVE A PRELIMINARY STRUCTURED REQUEST FROM THE LLM IN RESPONSE TO THE PROMPT, WHEREIN THE PRELIMINARY STRUCTURED REQUEST COMPRISES A CALL TO THE FUNCTION
240

POST-PROCESS THE PRELIMINARY STRUCTURED REQUEST, WHEREIN POST-PROCESSING THE PRELIMINARY STRUCTURED REQUEST COMPRISES EXECUTING THE FUNCTION AND GENERATING A REFINED STRUCTURED REQUEST, WHEREIN GENERATING THE REFINED STRUCTURED REQUEST COMPRISES MODIFYING THE PRELIMINARY STRUCTURED REQUEST BASED ON AN EXECUTION RESULT OF THE FUNCTION
250

OUTPUT THE REFINED STRUCTURED REQUEST
260

200

FIG. 2

```
"""View: Objects                              FIRST EXEMPLARY PROMPT 300
- ID
- STATUS_CODE
- STATUS_DESCRIPTION
- PRODUCT_ID
- PRODUCT_DESCRIPTION
- CREATED_AT Field with a fixed set of values:
- STATUS_CODE (with corresponding status description)
-- 0: New
-- 1: In Process
-- 2: Partially Shipped
-- 3: Fully Shipped
-- 4: Closed
"""
Question: All objects
Answer:{"query": "*"}

Question: closed objects
Answer: {"filter": {"attribute": "STATUS_CODE", "operator": "EQ", "value": "4"}}

Question: not marketing objects
Answer:{"filter": {"OperatorType": "NOT", "SubFilters": [{"attribute": "PRODUCT_DESCRIPTION",
"operator": "EQ", "function": "marketing"}]}}

Question: created yesterday
Answer:{"filter": {"attribute": "CREATED_AT", "operator": "EQ", "function": "DATE_RELATIVE",
"functionArguments": {"resolution": "DAY", "offset": -1}}}

Question: objects created last month
Answer: {"filter": {"attribute": "CREATED_AT", "operator": "EQ", "function": "DATE_RELATIVE",
"functionArguments": {"resolution": "MONTH", "offset": -1}}}

Question: marketing objects created in September 2023
Answer:{"filter": {"OperatorType": "AND", "SubFilters": [{"attribute": "CREATED_AT", "operator": "EQ",
"function": "DATE", "functionArguments": {"year": 2023, "month": 9}}, {"attribute":
"PRODUCT_DESCRIPTION", "operator": "EQ", "function": "marketing"}]}}

Question: sales demo
Answer: {"filter": {"attribute": "PRODUCT_DESCRIPTION","operator": "EQ","value": "sales demo"}}

Question: new objects created a week ago:
Answer: {"filter": {"OperatorType": "AND","SubFilters": [{"attribute": "STATUS_CODE", "operator": "EQ",
"value": "0"},{"attribute": "CREATED_AT", "operator": "EQ", "function": "DATE_RELATIVE",
"functionArguments": {"resolution": "WEEK", "offset": -1}}]}}

Question: show all sales orders from last week with PT100 that are shipped; show oldest orders first.
```

```
              FIRST EXEMPLARY PRELIMINARY STRUCTURED REQUEST 310

Answer: {"filter": {"OperatorType": "AND", "SubFilters": [{"attribute": "CREATED_AT", "operator": "EQ",
"function": "DATE_RELATIVE", "functionArguments": {"resolution": "WEEK", "offset": -1}}, {"attribute":
"PRODUCT_ID", "operator": "EQ", "value": "PT100"}, { "attribute": "STATUS_CODE", "operator": "IN",
"values": ["2", "3"] // Partially Shipped and Fully Shipped}]}, "sort": {"attribute": "CREATED_AT", "order":
"ASC"}}
```

FIG. 3

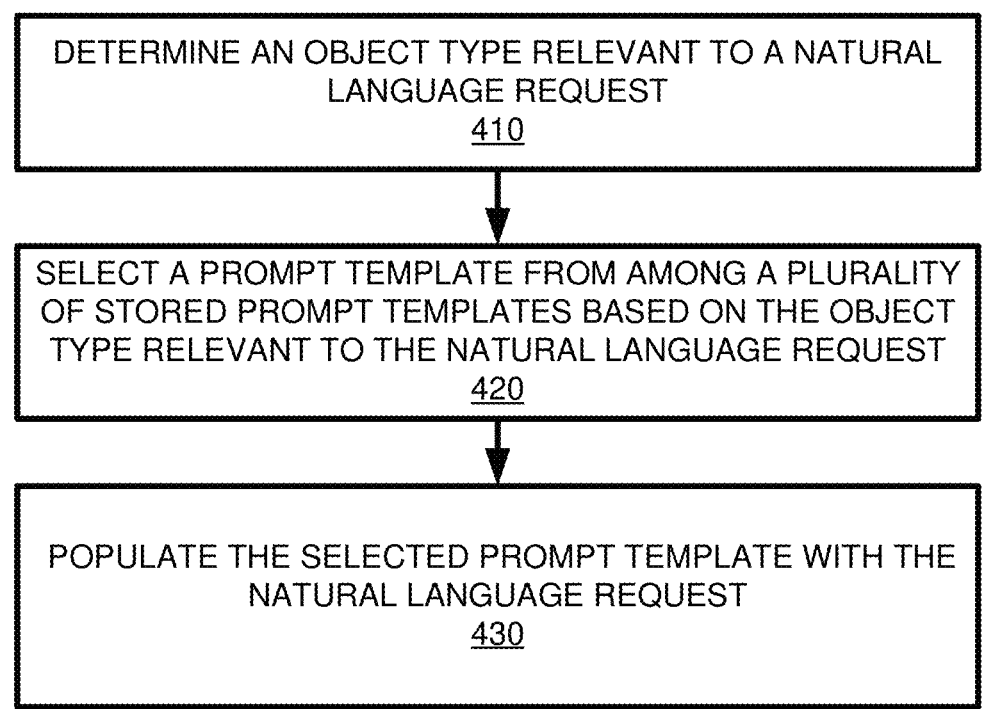
DETERMINE AN OBJECT TYPE RELEVANT TO A NATURAL
LANGUAGE REQUEST
410
SELECT A PROMPT TEMPLATE FROM AMONG A PLURALITY
OF STORED PROMPT TEMPLATES BASED ON THE OBJECT
TYPE RELEVANT TO THE NATURAL LANGUAGE REQUEST
420
POPULATE THE SELECTED PROMPT TEMPLATE WITH THE
NATURAL LANGUAGE REQUEST
430
400
FIG. 4

RECEIVE A NATURAL LANGUAGE REQUEST
510

GENERATE A PROMPT FOR AN LLM BASED ON THE NATURAL LANGUAGE REQUEST, WHEREIN GENERATING THE PROMPT COMPRISES: SELECTING, FROM AMONG A PLURALITY OF STORED PROMPT TEMPLATES, A PROMPT TEMPLATE COMPRISING A DATA MODEL AND ONE OR MORE EXAMPLES, WHEREIN A GIVEN EXAMPLE OF THE ONE OR MORE EXAMPLES COMPRISES AN EXAMPLE NATURAL LANGUAGE REQUEST AND A CORRESPONDING EXAMPLE STRUCTURED REQUEST COMPRISING CONTENT EXPRESSED IN A FIRST QUERY LANGUAGE; AND POPULATING THE PROMPT TEMPLATE WITH THE NATURAL LANGUAGE REQUEST
520

SUBMIT THE PROMPT TO THE LLM
530

RECEIVE A PRELIMINARY STRUCTURED REQUEST FROM THE LLM IN RESPONSE TO THE PROMPT, WHEREIN THE PRELIMINARY STRUCTURED REQUEST COMPRISES CONTENT EXPRESSED IN THE FIRST QUERY LANGUAGE AND A CALL TO A FUNCTION, AND WHEREIN THE FUNCTION COMPRISES COMPUTER-EXECUTABLE INSTRUCTIONS TO TRANSLATE THE CONTENT EXPRESSED IN THE FIRST QUERY LANGUAGE INTO CONTENT EXPRESSED IN A SECOND QUERY LANGUAGE
540

POST-PROCESS THE PRELIMINARY STRUCTURED REQUEST
550

EXECUTE THE FUNCTION, WHEREIN EXECUTING THE FUNCTION COMPRISES TRANSLATING THE CONTENT EXPRESSED IN THE FIRST QUERY LANGUAGE INTO CONTENT EXPRESSED IN THE SECOND QUERY LANGUAGE
550A

GENERATE A REFINED STRUCTURED REQUEST, WHEREIN GENERATING THE REFINED STRUCTURED REQUEST COMPRISES MODIFYING THE PRELIMINARY STRUCTURED REQUEST BY REPLACING THE CONTENT EXPRESSED IN THE FIRST QUERY LANGUAGE WITH THE CONTENT EXPRESSED IN THE SECOND QUERY LANGUAGE
550B

OUTPUT THE REFINED STRUCTURED REQUEST
560

500

FIG. 5

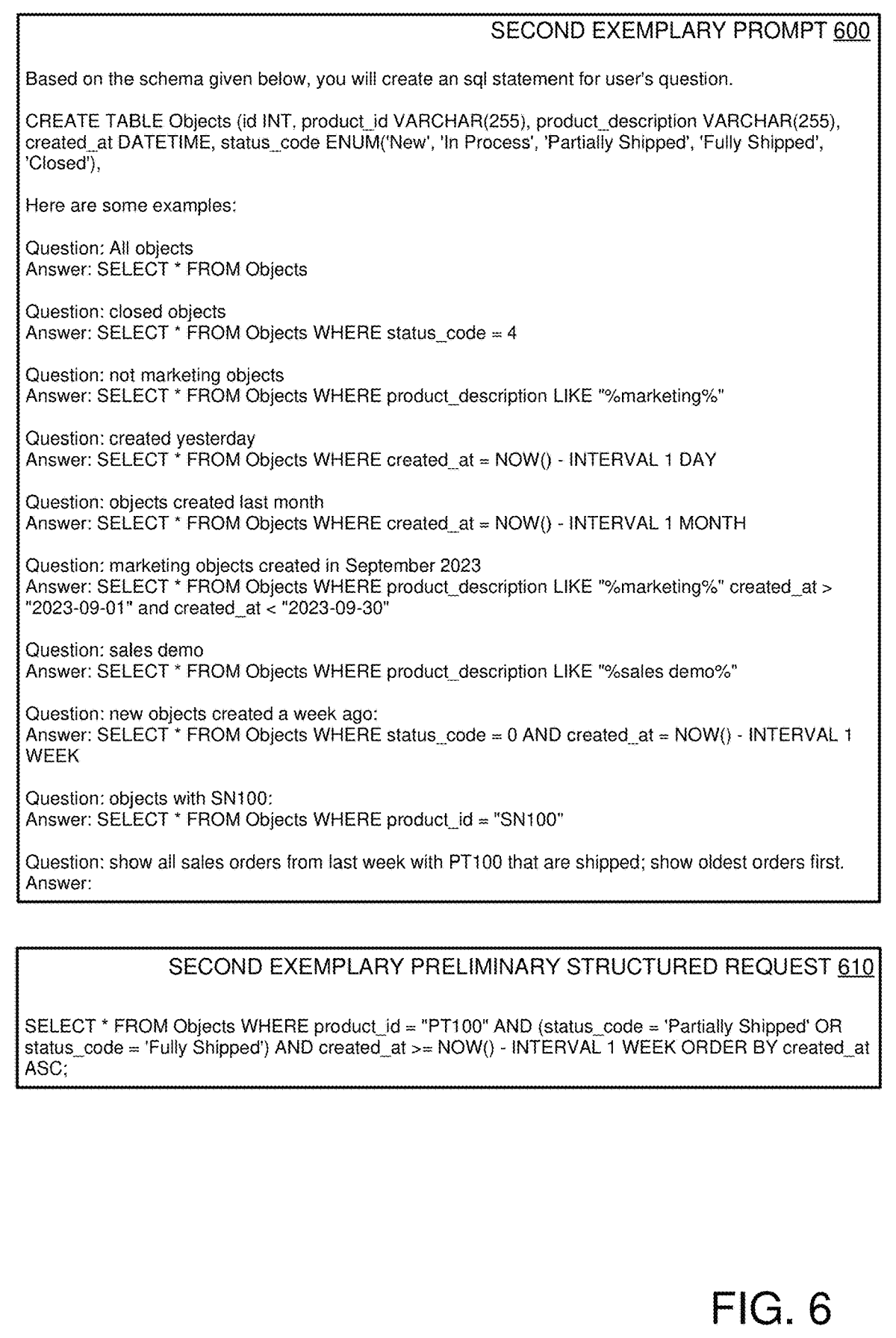

SECOND EXEMPLARY PROMPT 600

Based on the schema given below, you will create an sql statement for user's question.

CREATE TABLE Objects (id INT, product_id VARCHAR(255), product_description VARCHAR(255), created_at DATETIME, status_code ENUM('New', 'In Process', 'Partially Shipped', 'Fully Shipped', 'Closed'), Here are some examples:

Question: All objects
Answer: SELECT * FROM Objects

Question: closed objects
Answer: SELECT * FROM Objects WHERE status_code = 4

Question: not marketing objects
Answer: SELECT * FROM Objects WHERE product_description LIKE "%marketing%"

Question: created yesterday
Answer: SELECT * FROM Objects WHERE created_at = NOW() - INTERVAL 1 DAY Question: objects created last month
Answer: SELECT * FROM Objects WHERE created_at = NOW() - INTERVAL 1 MONTH Question: marketing objects created in September 2023
Answer: SELECT * FROM Objects WHERE product_description LIKE "%marketing%" created_at > "2023-09-01" and created_at < "2023-09-30"

Question: sales demo
Answer: SELECT * FROM Objects WHERE product_description LIKE "%sales demo%"

Question: new objects created a week ago:
Answer: SELECT * FROM Objects WHERE status_code = 0 AND created_at = NOW() - INTERVAL 1 WEEK Question: objects with SN100:
Answer: SELECT * FROM Objects WHERE product_id = "SN100"

Question: show all sales orders from last week with PT100 that are shipped; show oldest orders first.
Answer:

SECOND EXEMPLARY PRELIMINARY STRUCTURED REQUEST 610

SELECT * FROM Objects WHERE product_id = "PT100" AND (status_code = 'Partially Shipped' OR status_code = 'Fully Shipped') AND created_at >= NOW() - INTERVAL 1 WEEK ORDER BY created_at ASC;

FIG. 6

COMPUTING ENVIRONMENT 700

730 central processing unit 710 graphics or co-processing unit 715

MEMORY 720

MEMORY 725

COMMUNICATION CONNECTION(S) 770

INPUT DEVICE(S) 750

OUTPUT DEVICE(S) 760

STORAGE 740

SOFTWARE 780 IMPLEMENTING TECHNOLOGIES

AI-ASSISTED NATURAL LANGUAGE REQUEST TRANSFORMATION WITH REDUCED COGNITIVE LOAD

FIELD

The field generally relates to AI-assisted techniques for transforming natural language requests into structured requests.

BACKGROUND

Generative AI is adept at interpreting natural language input; however, the generated interpretations are not perfect. Generative AIs "hallucinate" by presenting wrong results confidently as facts, ignoring important parts of the input, failing to reliably process parts of the requirement, and/or having non-deterministic outputs.

These issues may not be very important if a human is always able and willing to judge and correct the generated output before taking further action. However, when generative AI is embedded into applications and users expect processes to work correctly without the need for continuous monitoring and modification of the AI output, the results need to be correct and deterministic.

BRIEF DESCRIPTION OF THE DRAWINGS

FIG. 2 is a flowchart of an exemplary method for AI-assisted transformation of a natural language request into a refined structured request with reduced cognitive load.

FIG. 3 is a block diagram of a first exemplary prompt and a corresponding first exemplary preliminary structured request.

FIG. 4 is a flowchart of an exemplary method for generating a prompt including object-type-specific examples for a natural language request.

FIG. 5 is a flowchart of an exemplary method for AI-assisted transformation of a natural language request into a refined structured request with reduced cognitive load which includes query translation.

FIG. 6 is a block diagram of a second exemplary prompt and a corresponding second exemplary preliminary structured request.

DETAILED DESCRIPTION

Overview

Figure 1:
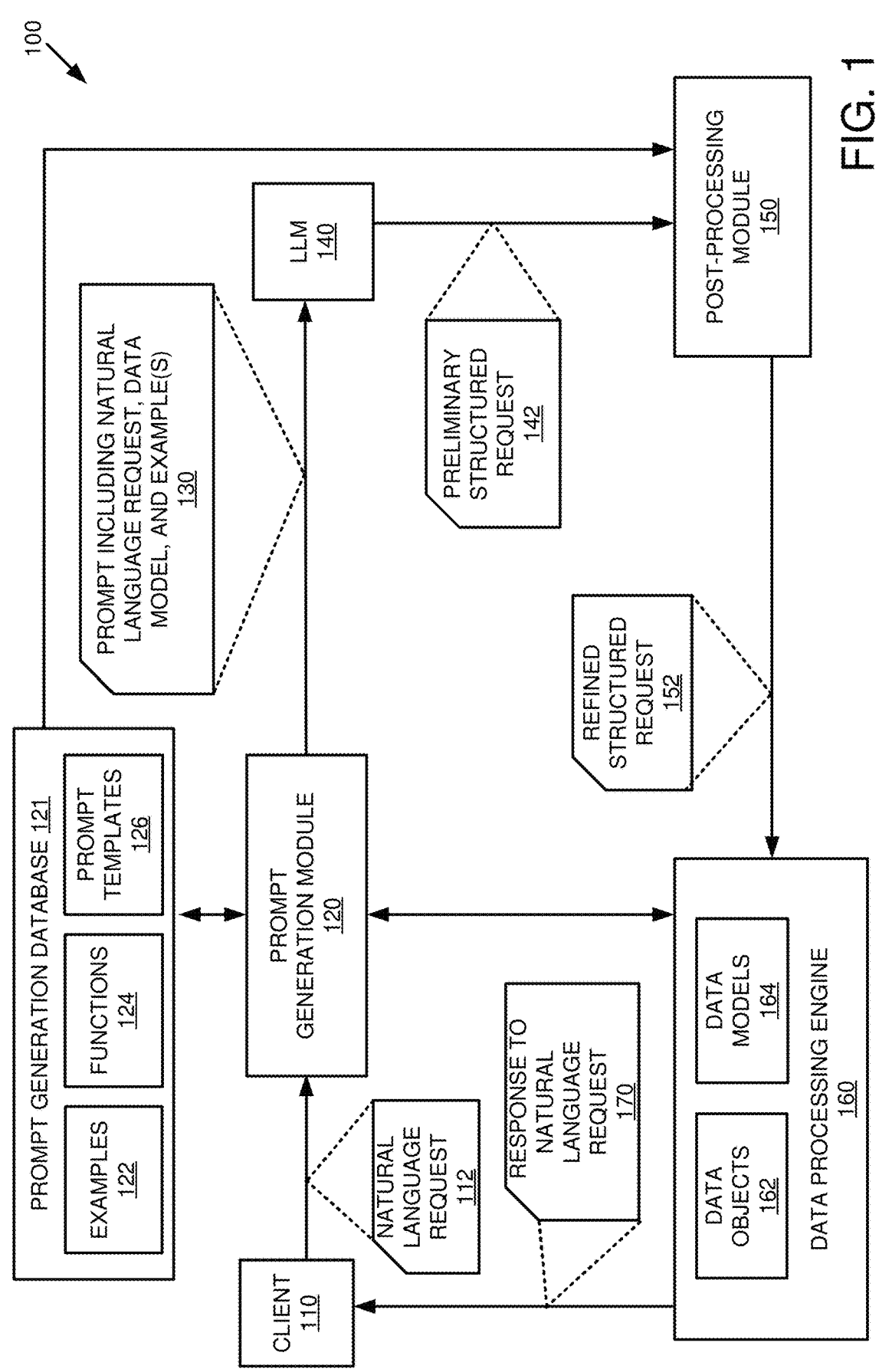
FIG. 1 is a block diagram of an exemplary system implementing AI-assisted natural language request transformation with reduced cognitive load.

To implement the transformation of natural language requests into structured requests using Large Language Models (LLMs), there are broadly three methods used today: prompt engineering, Retrieval Augmented Generation (RAG), and fine-tuning. These methods focus on "teaching" the domain to the generative AI.

In prompt engineering, the instruction sent to the LLM is referred to as a prompt. The prompt usually includes a mixture of natural language and structured input. Three common techniques for prompt engineering are the explanations and explicit instructions technique, the grounding technique, and the examples (few-shot learning) technique. A prompt generated in accordance with the explanations and explicit instructions technique includes explanations (e.g., "You are translating a natural language search request into a technical search request") and/or explicit instructions (e.g., "Only return a JSON, omit all explanations"). A prompt generated in accordance with the grounding technique includes a definition of the data model to which the request should be mapped. The data model definition usually contains a list of attributes with respective descriptions. For certain attributes, either some sample values or the complete list of values (e.g., for a status attribute) are provided. This is a very simple but important technique because otherwise the LLM would, like a human, invent attribute names or values. A prompt generated in accordance with the examples (few-shot learning) technique aims to "teach" the LLM the application-specific requirements. For instance, the prompt can include examples such as a list of question-answer pairs.

In the RAG method, numerous examples are created and vector representations of the examples are generated and stored in a database. The example(s) relevant to a specific request can then be retrieved from the database. Usually, this is done by translating the request into an embedding vector and comparing the request vector with the vector-representations of the stored examples. This method is typically used when the number of examples used in the prompt engineering method exceeds a predefined threshold, or if the examples used in the prompt engineering method confuse the LLM. RAG is often used to add recent or proprietary information to the LLM input. However, in this instance, RAG can also be used to provide examples which better fit the natural language input.

In the fine-tuning method, an LLM is fine-tuned with numerous question-answer pairs to tune the LLM to the problem domain.

Usually, the prompt engineering method is performed first; the RAG and/or fine-tuning methods are only performed if the accuracy achieved via prompt engineering is insufficient. For instance, after receiving an input natural language request, a prompt is generated by using a generic template or by mixing examples from a RAG-request and adding the specific input. The prompt is executed by generative AI, which generates an output. The direct output is used as the structured request (e.g., without post-processing or other manipulation). A structured request can alternatively be referred to as a technical request or database request, and can include a search request (e.g., search query), an OData request, or a request for generation of a new data model, for instance.

While the prompt engineering, grounding, and RAG methods can help generative AI to perform complex transformations, the output of the generative AI can be inaccurate and/or unstable in certain circumstances. For instance, the more the generative AI needs to "think," the more errors it tends to make. The present disclosure helps address these issues via a method referred to as Reducing Cognitive Load (RCL).

In the RCL method, the cognitive load (e.g., the computational or processing load) of the generative AI (e.g., an LLM) is minimized via strategic actions performed before and during runtime. The disclosed RCL techniques belong to two categories. In a first category, AI processing is minimized via techniques in which sub-tasks are solved programmatically. For instance, an expected generative AI output for a task can be analyzed to determine whether parts of the task can be solved programmatically instead of using generative AI. Only tasks which cannot be solved with traditional programmatic approaches are performed using generative AI, thereby reducing the cognitive load for the generative AI.

In a second category, the cognitive load for the AI is minimized via techniques in which the AI tasks are re-focused to a mainstream knowledge domain. Re-focusing an AI task to a mainstream knowledge domain can include investigating whether the task can be converted into a knowledge domain which is more represented in the training data set for the generative AI model being used. If the task can be converted into a mainstream knowledge domain, the task can be shifted from generative AI processing to a programmatical post-processing step. While this can involve significant effort, it can achieve a significant increase in accuracy.

For instance, at design time (e.g., during a development stage prior to runtime), exemplary transformations of natural language requests to structured requests are generated and stored in a database as examples. The development stage can also include an experimentation phase in which strategic prompts are submitted to the LLM to identify details regarding the knowledge domain of the LLM (e.g., to determine which query language the LLM is most knowledgeable about). Further, the development stage can include development of functions which can perform sub-tasks programmatically (e.g., sub-tasks associated with the natural language request which would otherwise be performed by the LLM). The functions can be included in the stored examples.

Further, during design time, the data model which is used to ground the request can be simplified or modified. This is especially important if the data model is very technical and not expressing the semantic "meaning" of the data in an easy-to-understand way. For instance, this can be due to technical constraints or inconsistent changes over time. Instances of this phenomenon include the presence of multiple company name fields in a customer object due to a historic length constraint (e.g., NAME1, NAME2, NAME3, NAME4) or code-description pairs (e.g., material number and material description in an order object). For the grounding data model, the former instance could be simplified to one name-field, whereas the latter instance could be simplified to one material field to avoid confusion regarding which specific field to use in LLM processing.

Next, a prompt is generated. Generation of the prompt can include selecting, from among a plurality of stored prompt templates, a prompt template comprising a data model and one or more examples. One or more of the examples in the prompt template can include function(s). Optionally, the prompt template can also include one or more directives (e.g., commands, instructions, or explanations) for the LLM. In some instances, the prompt template is selected based on an object type relevant to the natural language request, and the data model and example(s) of the prompt template pertain to or are specific to the object type relevant to the natural language request.

Generation of the prompt can further include populating the prompt template with the natural language request (e.g., adding the natural language request at a corresponding placeholder of the prompt template). The prompt can then be input to the LLM, which in turn generates a structured output (referred to herein as a preliminary structured request, as it is a preliminary structured version of the natural language request). The structured request may include one or more function calls corresponding to sub-tasks to be performed programmatically.

During a post-processing stage after receiving the preliminary structured request from the LLM, the preliminary structured request is modified. For instance, any functions in the preliminary structured request are executed by a post-processing module, and execution results of the functions are inserted at appropriate locations in the preliminary structured request. Additionally or alternatively, the post-processing module can modify the preliminary structured request in other ways (e.g., to convert the preliminary structured request into a desired format, and map the simplified field to the actual ones). The modified version of the preliminary structured request, referred to herein as a refined structured request, can then be output to a data processing engine for fulfillment. A response to the refined structured request received by the data processing engine can be output in response to the natural language request.

The accuracy of generative AI output can be improved significantly via the RCL techniques described herein. For instance, experimental results have shown that the accuracy of generative AI output can be improved by up to 15 percentage points via the RCL techniques described herein. This can make the difference between a demo with hand-picked examples and a productively usable product. The described technologies thus offer considerable improvements over existing prompt engineering, grounding, RAG, and fine-tuning methods.

Terminology

The usage and meaning of all quoted terms in this section applies throughout this disclosure unless clearly indicated otherwise or repugnant to the context. The terminology below extends to related word forms.

The term "exemplary" is used to denote representative or alternative embodiments, and is not intended to suggest that any embodiment is superior to or preferred over other embodiments.

An "application" or "software application" is a computer-executable program performing functions for one or more clients, and can be distinct from an operating system, a software library, a test suite, or a development environment. Additionally, some applications can operate without clients, e.g. launched by a supervisor or another application, performing tasks autonomously or in an event-driven mode. An application can include both executable instructions (dubbed "code" or "program code") and non-executable data (dubbed "application data" or "program data"). A software application can include one or more software processes and can be executed on a single computer or distributed over multiple computing systems.

An "application programming interface" (API), or "interface" for short, can define calling syntax for one or more methods of a software application such as a data processing engine.

"Call" refers to invocation of a software function or service. Some calls described herein include calls to functions that are part of rules, or calls to services of a data processing engine.

A "client" is a hardware or software computing entity that uses a resource provided by another hardware or software computing entity dubbed a "server".

The unqualified term "data" refers to any digital representation of information.

The term "data model" refers to a representation of how data is structured, organized, and related. It encompasses various forms, including schemas, which provide detailed specifications of database structures such as tables, fields, and relationships, and object definitions, which describe the attributes and behaviors of objects in object-oriented systems.

"OData" refers to the Open Data Protocol standard presently published by the Organization for the Advancement of Structured Information Standards (OASIS).

The term "database" (also, "database environment") refers to an organized collection of data maintained on computer-readable media and accessible by execution of instructions at one or more processors. Databases can be relational, in-memory or on disk, hierarchical or non-hierarchical, or any other type of database. A database can include a store of data coupled to software (dubbed "data processing engine") configured to perform operations on or with the stored data. As used herein, a data processing engine refers to any system, module, or component capable of processing requests involving data, including but not limited to database engines, search engines, graph engines, and analytics engines. The functionality of a data processing engine can be exposed to clients through an interface. An exemplary database interface can include, without limitation, an API, a web service, a browser interface, a console interface, or another user interface.

An LLM is a machine learning model designed to understand and generate human language. Such models typically leverage deep learning techniques such as transformer-based architectures to process language with a very large number (e.g., billions) of parameters. Exemplary LLMs include the Generative Pre-trained Transformer (GPT) developed by OpenAI (e.g., ChatGPT), Bidirectional Encoder Representations from Transforms (BERT) by Google, A Robustly Optimized BERT Pretraining Approach developed by Facebook AI, Megatron-LM of NVIDIA, Text-To-Text Transfer Transformer (T5) model by Google, or the like. Pretrained models are available from a variety of sources.

The term "engine" refers to a software application that can provide one service, or multiple related services, responsive to a succession of inputs from one or more clients. For instance, a database engine can provide query handling for a database. An LLM can extract structure (in particular, a query data structure) from natural language input (in particular, a natural language query).

A "field" is a member of a datatype or data structure (e.g. a query data structure or a record in a database) having a particular role. A field can have a value, or can be undefined.

A "filter" is a specification of one or more arguments for a query to a data processing engine. A filter can be a string encoding output query parameters.

A "function" is an executable software module that, when executed, takes an input and generates a corresponding output. The input and output can be of a same or different datatypes, and these datatypes can be simple or complex datatypes, in any combination.

A "natural language" is a form of encoded communication among humans that has evolved through spoken or written usage over time. Thus, natural languages are distinguished from computer programming languages, constructed languages such as Esperanto, codes such as Morse code, or machine-to-machine communication codes such as used for telephony, data communication, or wireless communication. Arabic, Bengali, Chinese (e.g., Mandarin), English, French, German, Hausa, Hindi, Japanese, Korean, Malay, Persian, Portuguese, Quechua, Russian, Spanish, in their various regional variations and dialects, are all natural languages, along with a multitude of other well-known and less common languages. While some instances of natural language text in this disclosure are in the form of electronic text, this is not a requirement-a natural language query can be input as speech and converted to text, for processing in some of the disclosed methods. The term natural language also does not preclude rendering or representing a natural language message by electronic means, such as entry at a keyboard, storage as an ASCII or Unicode character set, display on a computer monitor, or rendition to speech by a text-to-speech device.

The term "parse" refers to an operation of traversing a sequence of text tokens to identify, categorize, or extract one or more of the tokens.

A "query" is a request for information, such as information contained within a database environment.

A "structured request" is a data structure that represents a request (e.g., query) in a structured form. A structured request can be implemented in JavaScript Object Notation (JSON), Extensible Markup Language (XML), in another markup language, or in binary form.

In the context of data transfer between hardware or software entities, the terms "receive" and "transmit" refer to communication over a network, which can be in the form of a message. The communication can be electromagnetic, e.g. over wired, wireless, or optical media, but this is not a requirement.

A "server" is a computing system, implemented as hardware on which software is executed, providing one or more services or access to one or more resources for at least one client, and often for a plurality of clients. In this disclosure, servers can host software applications, software modules, LLMs, or data processing engines, or can provide other functions.

"Software" refers to computer-executable programs or instructions and associated data structures. Software can be in active or quiescent states. In an active state, software can be loaded into memory or undergoing execution by one or more processors. In a quiescent state, software can be stored on computer-readable media, awaiting transmission or execution. Software can be organized as a "module", containing one or more functions and associated data directed to a common task or group of related tasks.

A "store" or "repository" is a data storage entity. The term store can be qualified by a type of data stored therein.

"Text" is a representation of one or more words (e.g. "apple"), or printable characters (e.g. "01.01.2020"), which convey semantic meaning. While text can often be an electronic representation, this is not a requirement, and some instances of text herein can originate in audio (e.g. spoken) or paper (e.g. handwritten or typed) forms. Electronic text can be stored in memory or on a storage device, with suitable encoding, and can also be encrypted.

A "token" is an atomic component of a body of text. Commonly, a token can be a word. The body of text can be an input query in a natural language, which can be free form text, with or without punctuation. Some tokens (e.g. dates or hyphenated names) can represent character strings which include certain punctuation symbols. Some tokens can represent a named entity recognized in text. Some tokens can represent combinations of words or other smaller tokens. A token can have a semantic value which is at least partly based on the original text represented by the token.

A "word" is a sequence of consecutive characters from a predetermined alphabet. A "word" can be a basic unit of human language, having one or a finite number of semantic meanings that are absent in smaller portions of the word. Commonly, the predetermined alphabet in English includes lower-case and upper-case letters. Other languages can have similar alphabets, and some can include character modifiers and modified character forms. Often, the predetermined alphabet can include numerals (0-9) or certain punctuation marks (e.g. "_", "-", "$", "#", "+", "=", ">", "<", or "/") while excluding other punctuation marks (e.g. ",", ";", ":", ".", "?", "!") which, along with whitespace, can be treated as delimiters.

Exemplary System Implementing AI-Assisted Natural Language Request Transformation with Reduced Cognitive Load FIG. 1 is a block diagram of system 100 implementing AI-assisted natural language request transformation with reduced cognitive load according to the disclosed technologies. System 100 includes a client 110, a prompt generation module 120, a prompt generation database 121, an LLM 140, a post-processing module 150, and a data processing engine 160, among other elements. In accordance with the techniques described herein, the cognitive load of the LLM 140 associated with transforming the natural language request into a corresponding structured request can be reduced via actions performed at design time (e.g., during a development stage prior to runtime) as well as during runtime.

During the development stage prior to runtime, a plurality of examples 122 transformations of natural language requests to structured requests are collected and stored in the prompt generation database 121. For instance, a user (e.g., a software engineer) can create the examples and/or obtain relevant existing examples. Additional examples can be added when the actual transformations are not fulfilling the requirements, to steer the LLM in the right direction. Optionally, the LLM can assist with generation of one or more of the examples 122.

Further, during the development stage, a user can adapt the data model to reduce complexity and improve understandability. For instance, this can be achieved by combining multiple fields into one, or by introducing some mapping between technical expressions and their semantic meaning.

Moreover, during the development stage, a user can submit strategic prompts to the LLM to identify details regarding the training dataset and/or the knowledge domain of the LLM. For instance, the strategic prompts can aim to determine which query language the LLM is most knowledgeable about.

Furthermore, during the development stage, functions 124 for performing sub-tasks programmatically can be collected and stored in the prompt generation database 121. For instance, a user can write functions and/or obtain existing functions that are executable to perform sub-tasks associated with natural language requests (e.g., sub-tasks which would otherwise be performed by the LLM). As described further herein, one or more of the examples 122 can reference (e.g., include a call to) one or more the functions 124.

A plurality of prompt templates 126 are generated and stored in the prompt generation database 121 during the development stage. For instance, the prompt templates 126 can include respective prompt templates for different data models. During the development stage, a generic prompt template or a blank prompt template can be populated with information such the relevant data model, one or more examples (e.g., one or more of examples 122), and optionally, one or more directives for the LLM. Alternatively, the prompt generation module 120 can populate the respective prompt templates 126 with appropriate examples, data models, and/or other elements at a different stage, as described below.

After the development stage, the client 110 can issue a natural language request 112. The natural language request 112 can be input by a user of the client 110 (e.g., via a user interface) and can include a request, written in natural language, or spoken and transformed to text via a speech-to-text component, for the data processing engine 160 to perform one or more actions. The requested actions can include searching for data objects that meet certain criteria among data objects 162 stored in the data processing engine 160 (e.g., the natural language request can be understood as a natural language search request or natural language search query for the data processing engine 160). Additionally or alternatively, the requested actions can involve the data processing engine 160 performing a data operation (e.g. create, read, update, delete, search) in response to an OData request, the generation and usage of a new data model by the data processing engine 160, or other actions.

The natural language request 112 is forwarded as input to the prompt generation module 120. To generate a prompt 130 for the LLM 140 based on the natural language request 112, the prompt generation module 120 can select a prompt template for the natural language request 112 from among the prompt templates 126 stored in the prompt generation database 121. For instance, the prompt generation module 120 can determine an object type relevant to the natural language request 112 and select an appropriate one of the prompt templates 126 for the natural language request 112 based on the relevant object type. The prompt generation module 120 can then update the selected prompt template to include the natural language request 112 (e.g., by injecting the text of the natural language request 112 at a placeholder of the prompt template). The text of the natural language request 112 may be included in the prompt template verbatim; alternatively, pre-processing of the natural language request 112 may be performed before it is added to the prompt template.

To determine the object type relevant to the natural language request 112, the prompt generation module 120 can retrieve data models 164 stored at the data processing engine 160 and compare the content of the data models 164 to the natural language request 112. The determination of the relevant object type can be performed programmatically (e.g., by execution of computer-readable instructions of the prompt generation module 120), with or without assistance from LLM 140, or by other means such as hybrid or semantic search using vector embeddings. Additionally or alternatively, a user (e.g., a software engineer rather than an end user who submitted the natural language request) can perform the determination of the relevant object type for the natural language request.

Alternatively, the generation of the prompt 130 based on the natural language request 112 can be performed in a different manner (e.g., when there are relatively few object types to choose from). For instance, rather than selecting a pre-populated prompt template which already includes a data model and example(s) and inserting the natural language request 112, the prompt generation module 120 can determine the relevant object type for the natural language request 112 and populate a generic or blank prompt template with the data model for the relevant object type along with one or more of the examples 122 at runtime (e.g., at corresponding placeholders for the data model and examples). A given one of the examples 122 can include some indication of the object type(s) to which it applies. For instance, certain examples may only be relevant to a single object type or a subset of the possible object types, whereas other examples may be relevant for all possible object types.

Optionally, the prompt generation database 121 can store sets of examples for the respective object types, and the prompt generation module 120 can retrieve the appropriate set of examples to add to the prompt template for a given natural language request 112 based on the relevant object type for the natural language request 112. Additionally or alternatively, the example(s) added to the prompt can optionally be selected based on other aspects of the natural language request 112 than the relevant object type.

After generating the prompt 130, which includes the natural language request 112, the relevant data model, any optional directives for the LLM, and the selected example(s), the prompt generation module 120 submits the prompt 130 as an input to the LLM 140. The LLM 140 analyzes the relationships between example natural language requests and corresponding example structured requests in the examples set forth in the prompt to learn the underlying mapping rules or transformations, and then applies those learned relationships to produce a structured output based on the natural language request 112.

For instance, a given example set forth in the prompt can include a call to a function in its example structured request, along with one or more parameters for the function and respective values of the one or more parameters. Assuming that the LLM 140 determines the example natural language request of the given example is relevant to the natural language request 112 in some way, the LLM 140 may include a call to that same function in the structured output it produces in response to the prompt.

The structured output generated by the LLM 140 is referred to as a preliminary structured request 142, as it represents a preliminary version of a structured request which will be refined before it is submitted to the data processing engine 160 for processing. In instances where the preliminary structured request 142 includes a call to a function, the preliminary structured request can also include one or more parameters for the function and respective values of the one or more parameters.

In particular, the preliminary structured request 142 is forwarded as an input to the post-processing module 150, which performs post-processing to refine the preliminary structured request 142 into a refined structured request 152.

The post-processing of the preliminary structured request 142 performed by the post-processing module 150 can include executing the function(s) that are called in the preliminary structured request 142. For instance, the post-processing module 150 can retrieve a given function called in the preliminary structured request 142 (e.g., by retrieving the computer-executable code included in the function from the prompt generation database 121) and execute the function to obtain an execution result. The post-processing module 150 can then generate a refined structured request 152 by modifying the preliminary structured request based on the execution result of the given function, as described further herein.

As shown, the refined structured request 152 can be transmitted to data processing engine 160. Data processing engine 160 can process the refined structured request 152 and produce a response to natural language request 170 (i.e., a response to the natural language request issued by the client 110). The response to natural language request 170 can be returned to the client 110. For instance, the response to natural language request 170 can be displayed via a user interface of the client 110.

Depending on the request type of the natural language request 170 (and thus, of the corresponding refined structured request), the content of the response to natural language request 170 can vary. For instance, where the refined structured request 152 is a search query that comprises one or more clauses, the response to natural language request 170 can include a subset of the data objects 162 that satisfy the one or more clauses. In such an instance, the subset of the data objects 162 can be output in the form of a data structure (e.g., a table comprising rows corresponding to respective data objects).

In some instances, the data objects 162 are structured objects that are physically stored in a data store of the data processing engine 160. In other instances, a data store of the data processing engine 160 can include a schema that references data objects physically stored in another location. For instance, the data store can be a relational database, and the schema can be a physical data model. In another instance, the data store can be a virtual data model, such as ABAP or CDS views in technologies of SAP SE, of Walldorf, Germany. The data objects 162 can be defined with respect to a schema associated with a system that physically stores data, such as where ABAP or CDS views are defined with respect to relational database tables.

Any of the systems herein, including the system 100, can comprise at least one hardware processor and at least one memory coupled to the at least one hardware processor.

The system 100 can also comprise one or more non-transitory computer-readable media having stored therein computer-executable instructions that, when executed by the computing system, cause the computing system to perform any of the methods described herein.

In practice, the systems shown herein, such as system 100, can vary in complexity, with additional functionality, more complex components, and the like. Additional components can be included to implement security, redundancy, load balancing, report design, and the like.

The described computing systems can be networked via wired or wireless network connections, including the Internet. Alternatively, systems can be connected through an intranet connection (e.g., in a corporate environment, government environment, or the like).

The system 100 and any of the other systems described herein can be implemented in conjunction with any of the hardware components described herein, such as the computing systems described below (e.g., processing units, memory, and the like). Any of the data objects 162, the data models 164, the examples, the functions, and the like described herein can be stored in one or more computer-readable storage media or computer-readable storage devices. The technologies described herein can be generic to the specifics of operating systems or hardware and can be applied in any variety of environments to take advantage of the described features.

Exemplary Transformation of a Natural Language Search Request into a Refined Structured Search Request In an illustrative embodiment, the technologies described herein can be used in the context of enterprise search to search for structured objects such as structured business objects. For instance, a natural language request with a request type of search request can be transformed via the disclosed RCL methods into a corresponding refined structured request (e.g., a proprietary technical search request). While the illustrative embodiment pertains to an exemplary search request for sales order objects in particular, the transformation can be performed for different types of structured objects (e.g., sales orders, product objects, customer objects, and the like).

In the illustrative embodiment, the sales order object can include the following attributes: ID; STATUS_CODE; STATUS_DESCRIPTION; PRODUCT_ID; PRODUCT_DESCRIPTION; and CREATED_AT. The existing statuses for the sales order object (i.e., the values of the STATUS_CODE attribute and the corresponding values of the STATUS_DESCRIPTION attribute) are set forth in Table 1 below.

TABLE 1

| Sales Order Business Object Statuses | |
|---|---|
| STATUS_CODE | STATUS_DESCRIPTION |
| 0 | New |
| 1 | In Process |
| 2 | Partially Shipped |
| 3 | Fully Shipped |
| 4 | Closed |

A data model for the sales order object can specify the attributes of the sales order object and possible values of the attributes (e.g., the values set forth in Table 1), among other information.

In the illustrative embodiment, the following natural language request is issued by a client: "show all sales orders from last week with PT100 that are shipped; show oldest orders first." Here, the token "PT00" refers a value of the PRODUCT_ID attribute, and the token "shipped" refers to the two values Partially Shipped and Fully Shipped of the STATUS_DESCRIPTION attribute. Further, the token "last week" is associated with the CREATED_AT attribute.

The illustrative embodiment is referenced throughout the following description to facilitate understanding of certain aspects of the disclosed technologies. For instance, the following description of an exemplary method for AI-assisted transformation of a natural language request into a refined structured request includes references to the particular natural language request and sales order object described in the illustrative embodiment.

Exemplary Method for AI-Assisted Transformation of a Natural Language Request into a Refined Structured Request FIG. 2 is a flowchart of an exemplary method 200 for AI-assisted transformation of a natural language request into a refined structured request and can be performed, for instance, by the system of FIG. 1.

At 210, a natural language request is received (e.g., at a prompt generation module such as prompt generation module 120 of FIG. 1). As described herein, the natural language request can be a search request, OData request, request for generation of a new data object, or another type of request. The natural language request includes text written in plain language (rather than in a programming or query language) in an unstructured format. For instance, in the illustrative embodiment, the natural language request is "show all sales orders from last week with PT100 that are shipped; show oldest orders first."

At 220, a prompt for a Large Language Model (LLM) is generated based on the natural language request. As indicated, the prompt includes a data model, one or more examples, and the natural language request. Generating the prompt can include, for instance, selecting a prompt template comprising the data model and the one or more examples from among a plurality of stored prompt templates. A given example of the one or more examples comprises an example natural language request and a corresponding example structured request, and the example structured request comprises a call to a function. Generating the prompt can further include adding the natural language request to the prompt template. Optionally, the prompt can also include additional content such as one or more directives for the LLM. First and second exemplary prompts which may be generated based on the exemplary natural language request from the illustrative embodiment are described below with references to FIGS. 3 and 6.

At 230, the prompt is submitted to an LLM (e.g., LLM 140 of FIG. 1, which may be a third party LLM hosted externally). At 240, a preliminary structured request is received from the LLM in response to the prompt. The preliminary structured request can include a call to the function, among other elements. Exemplary preliminary structured requests which may be received from an LLM in response to the first exemplary prompt 300 and the second exemplary prompt 600 are also shown in FIGS. 3 and 6, respectively.

At 250, the preliminary structured request is post-processed (e.g., by a post-processing module such as post-processing module 150 of FIG. 1). Post-processing the preliminary structured request can include executing the function and generating a refined structured request, wherein generating the refined structured request comprises modifying the preliminary structured request based on an execution result of the function. Post-processing the preliminary structured request can also include performing mapping between the semantic fields which are used by the LLM and the technical fields which will be used in the refined structured request submitted to the data processing engine (e.g., as in the attribute group technique described below).

At 260, the refined structured request is output. For instance, the refined structured request can be output to a data processing engine such as data processing engine 160 of FIG. 1, which in turn can perform processing (e.g., execute a search query) in response to the refined structured request and generate a response. The response can be output by the data processing engine in response to the natural language request (e.g., output to a client from which the natural language request was issued).

The method 200 and any of the other methods described herein can be performed by computer-executable instructions (e.g., causing a computing system to perform the method) stored in one or more computer-readable media (e.g., storage or other tangible media) or stored in one or more computer-readable storage devices. Such methods can be performed in software, firmware, hardware, or combinations thereof. Such methods can be performed at least in part by a computing system (e.g., one or more computing devices).

The illustrated actions can be described from alternative perspectives while still implementing the technologies. For instance, receiving a request can be described as sending a request depending on perspective.

First Exemplary Prompt and Corresponding First Exemplary Preliminary Structured Request FIG. 3 is a block diagram of a first exemplary prompt 300 and a corresponding first exemplary preliminary structured request 310. The first exemplary prompt 300 can be generated by a prompt generation module (e.g., prompt generation module 120 of FIG. 1) based on the exemplary natural language request "show all sales orders from last week with PT100 that are shipped; show oldest orders first" from the illustrative embodiment described above.

The prompt 300 includes a data model (i.e., the section at the beginning which specifies the attributes of the sales order object), and further specifies the fixed values of the STATUS_CODE field. In addition, the prompt 300 includes a plurality of examples. As shown, each of the examples includes an example natural language request (i.e., the portion prefaced by "Question:" and a corresponding example structured request (i.e., the portion prefaced by "Answer:"). Furthermore, the prompt 300 includes the natural language request from the illustrative embodiment prefaced by "Question:" (i.e., "Question: show all sales orders from last week with PT100 that are shipped; show oldest orders first").

In prompt 300, the data model and the fixed values for the STATUS_CODE field are followed by the examples, which in turn are followed by the text of the natural language request. In other instances, the various elements of a prompt can be arranged in a different order. In addition, a prompt can also include additional elements or fewer elements than those depicted in FIG. 3.

Certain examples set forth in the prompt 300 include functions. As described herein functions can provide a way to split up certain tasks associated with the transformation of the natural language request. For instance, including functions in the examples can guide the LLM to identify a relevant function for a given task of a natural language request and include a call to the function in its output (i.e., in the corresponding preliminary structured request output by the LLM), rather than the LLM itself performing the task. The task can then be performed by the post-processing module via execution of the function.

In the illustrative embodiment, a date function is introduced. Accordingly, instead of translating "last week" and the information that today is 2023 Feb. 21 directly into the statement "CREATED_AT": {"operator": "GE", "value": "2023-02-14"}, the task is split into an LLM part and a programmatic part. As a result, the first exemplary preliminary structured request 310 output by the LLM is as follows: {"attribute": "CREATED_AT", "operator": "EQ", "function": "DATE_RELATIVE", "functionArguments": {"resolution": "WEEK", "offset": −1}.

The post-processing module can then take the function name and parameters from the LLM output and determine the actual date value. To generate the corresponding refined structured output, the post-processing module can replace the function call with the date value and performing any other necessary post-processing steps.

Exemplary Attribute Group Technique

In some instances, an attribute group technique can be used to reduce cognitive load for the LLM. Attribute groups are helpful when the user input matches to attributes ambiguously. In the illustrative embodiment, PT100 could be a PRODUCT_ID or a PRODUCT_DESCRIPTION. Without knowing the data, or specific patterns, neither a human nor an LLM can easily distinguish between PRODUCT_ID and PRODUCT_DESCRIPTION.

One solution to this problem identified during development of the disclosed technologies is to create an artificial field (e.g., PRODUCT_NAME in the illustrative embodiment) for LLM processing. Accordingly, the preliminary structured request output by the LLM would become "PRO- DUCT_NAME": "PT100", which can be mapped programmatically in a post-processing step to: "$or": [{"PRODUCT_ID": "PT100"}, {"PRODUCT_DESCRIPTION": "PT100"}].

In accordance with the attribute group technique, prior to receiving a natural language request, it can be determined that a given data model comprises two or more attributes with names that include a common token. An artificial attribute can be added to the given data model; a name of the artificial attribute can be an abstraction of the names of the two or more attributes (e.g., PRODUCT_NAME is an abstraction of PRODUCT_ID and PRODUCT_DESCRIPTION).

Exemplary Search Delegation Technique

While it can be helpful to provide a list of possible values for a given attribute in the LLM prompt so that the LLM can determine the correct attribute to map to a given token, using LLMs to search within a list of values can add to the cognitive load.

For instance, with reference to the illustrative embodiment, instead of letting the LLM determine that "shipped" corresponds to "Partially Shipped" and "Fully Shipped" and map "shipped" to the respective STATUS_CODEs 2 and 3, (i.e., such that the preliminary structured request output by the LLM is "STATUS_CODE": {"operator": "IN", "value": [2, 3]},) this task can instead be split into two parts. In particular, the LLM can perform the sub-task of determining that "shipped" is a STATUS_DESCRIPTION, whereas the actual search for "shipped" within the STATUS_DESCRIPTION can be performed by the data processing engine itself (i.e., in response to the refined structured request). Thus, when the search delegation technique is used, the preliminary structured output of the LLM becomes: "STATUS_DESCRIPTION": {"operator": "SEARCH", "value": "shipped"}."

Accordingly, the search delegation technique can be used in an exemplary transformation process where the data model for the object type relevant to the natural language request includes a related attribute pair comprising a first attribute (e.g., STATUS CODE) and a second attribute (e.g., STATUS DESCRIPTION), and where possible values of the first attribute correspond to respective possible values of the second attribute. In this instance, the prompt can include a first example having an example natural language request comprising a token (e.g., "shipped") that potentially matches at least two candidate values of the second attribute (e.g., PARTIALLY SHIPPED, FULLY SHIPPED). The example structured request of the first example can include a clause that is satisfied for a given structured object when a value of the second attribute in the given structured object includes the token. In this instance, the example structured request of the first example does not include a clause that is satisfied for the given structured object when a value of the first attribute in the given structured object matches at least two candidate values of the first attribute (e.g., 2, 3) that correspond to the at least two candidate values of the second attribute, respectively.

Object-Type-Specific Examples

During development of the disclosed technologies, it was initially assumed that in instances where the transformation will be performed for multiple object types, one generic object type should be used in the examples to explain the mapping and the LLM should do the work of mapping from the generic examples to the specific object type present in the natural language request. For instance, it was assumed that this approach would be preferable as it requires less effort by the software developers during the development stage.

However, it was later determined during the development of the disclosed technologies that this additional translation from the generic object type to the actual object type decreases accuracy of the LLM output in addition to adding to the cognitive load of the LLM. Accordingly, instead of providing one generic set of examples, object-type specific examples are utilized in the disclosed techniques despite the higher upfront effort required.

FIG. 4 is a flowchart of an exemplary method 400 for generating a prompt including object-type-specific examples for a natural language request and can be performed, for instance, by the system of FIG. 1. At 410, an object type relevant to a natural language request is determined. The determination can be performed by the prompt generation module or by another entity (e.g., by comparing the natural language request to stored data models).

At 420, a prompt template is selected from among a plurality of stored prompt templates based on the object type relevant to the natural language request. At 430, the selected prompt template is populated with the natural language request. As described above, generating a prompt that is specific to an object type relevant to the natural language request can improve the accuracy of the LLM output as compared to techniques in which the LLM is tasked with generating object-type-specific examples based on a generic set of examples.

Exemplary Method for AI-Assisted Transformation of a Natural Language Request into a Refined Structured Request with Query Language Translation As described above, the cognitive load for an LLM can also be minimized via techniques in which certain AI tasks are re-focused to a mainstream knowledge domain. Re-focusing an AI task to a mainstream knowledge domain can include investigating whether the task can be converted into a knowledge domain which is more represented in the training data set for the generative AI model being used. For instance, during development of the technologies described herein, it was determined that proprietary query languages tend to be poorly represented in the training data for LLMs, or not represented at all. The same issue arises in the context of other domains than query languages (e.g., LLMs tend to focus on mainstream rather than specialized knowledge domains).

To address this issue, certain techniques can be performed during the development stage to find out the mainstream knowledge domain of a given LLM. In one approach, a pertinent question for a knowledge domain can be provided to the LLM with no further explanations or examples. By repeating that process a few times, the mainstream knowledge domain to which the LLM tends "naturally" can be determined.

After the relevant mainstream knowledge domain has been determined for the LLM, certain tasks performed by the LLM can be re-focused to the relevant mainstream knowledge domain to reduce the cognitive load of the LLM. It may be necessary to evaluate whether the mainstream knowledge domain can cover the requirements for a given task. If not, it may be possible to train the LLM for the special requirements by providing examples in the prompt for the extension cases.

As one application of this technique, when an LLM tends naturally towards a certain language, the prompt generation module can tailor the stored examples and/or the stored prompt templates such that the LLM performs tasks in that language (e.g., rather than in a more obscure language which would require additional cognitive load for the LLM). During development of the disclosed technologies, it was determined that Structured Query Language (SQL) is a good candidate for this technique. In particular, the examples can be expressed in a non-proprietary query language such as SQL rather than in a less familiar query language (e.g., a proprietary query language used by the data processing engine, also referred to as a domain-specific query language). The preliminary structured request output by the LLM, which includes content expressed in SQL, can then be translated to the appropriate query language for the data processing engine in a programmatic post-processing step. While the programmatic translation during post-processing can require significant effort, but the increase in accuracy of the LLM output is also significant due to the reduction in cognitive load achieved by offloading the translation task. Additionally, prompts and responses in SQL are shorter which reduces runtime and costs.

This approach can be applied iteratively in knowledge sub-domains as well. For instance, instead of trying to override LLM outputs with more examples which increase the cognitive load, the LLM output can instead be adapted to and modified as desired during post-processing.

With reference to the illustrative embodiment, when this technique is added to the previously described techniques, the expected preliminary structured output of the LLM is as follows: "SELECT * FROM sales_orders WHERE status_description LIKE '%shipped%' AND product_name='PT100' AND created_at >=NOW( )—INTERVAL 1 WEEK ORDER BY created_at ASC."

In some instances, the translation can be performed via execution of a function which is called in the preliminary structured request. For instance, one or more of the examples in a given prompt can include a call to a translation function which, when executed, effects translation of the contents of a given request to a different language. FIG. 5 is a flowchart of an exemplary method 500 for AI-assisted transformation of a natural language request into a refined structured request with query language translation in accordance with such techniques. Method 500 can be performed, for instance, by the system of FIG. 1. Certain steps of method 500 are identical to corresponding steps of method 200 of FIG. 2 and will not be described in detail. However, in contrast to method 200, method 500 also includes query language translation steps.

At 510, a natural language request is received (e.g., at a prompt generation module such as prompt generation module 120 of FIG. 1). At 520, a prompt for an LLM is generated based on the natural language request. As indicated, generating the prompt includes selecting, from among a plurality of stored prompt templates, a prompt template comprising a data model and one or more examples, wherein a given example of the one or more examples comprises an example natural language request and a corresponding example structured request comprising content expressed in a first query language. For instance, the first query language may be a mainstream query language (e.g., SQL) which was determined during the development stage to be the query language the LLM is most comfortable with. In contrast, the data processing engine which will ultimately receive a refined structured request based on the natural language request may use a second, different query language (e.g., a proprietary query language with which the LLM is less familiar). Generating the prompt further includes populating the prompt template with the natural language request.

At 530, the prompt is submitted to an LLM. At 540, a preliminary structured request is received from the LLM in response to the prompt. The preliminary structured request includes content expressed in the first query language and a call to a function. The function includes computer-executable instructions to translate the content expressed in the first query language into content expressed in a second query language. In other instances, the translation may be performed in a different manner (e.g., by pre-existing code within the post-processing module rather than by a function in the preliminary structured request, or by another entity such as an external translation service during the post-processing phase).

At 550, the preliminary structured request is post-processed (e.g., by a post-processing module such as post-processing module 150 of FIG. 1). At 550A, post-processing the preliminary structured request includes executing the function, wherein executing the function comprises translating the content expressed in the first query language into content expressed in the second query language. At 550B, post-processing the preliminary structured request includes generating a refined structured request, which in turn includes modifying the preliminary structured request by replacing the content expressed in the first query language with the content expressed in the second query language.

At 560, the refined structured request is output. For instance, the refined structured request can be output to a data processing engine which uses the second query language. The data processing engine can perform processing in response to the refined structured request and generate a response, which in turn can be output by the data processing engine in response to the natural language request.

Second Exemplary Prompt and Corresponding Second Exemplary Preliminary Structured Request FIG. 6 is a block diagram of a second exemplary prompt 600 and a corresponding second exemplary preliminary structured request. The second exemplary prompt 600 can be generated by a prompt generation module (e.g., prompt generation module 120 of FIG. 1) based on the exemplary natural language request "show all sales orders from last week with PT100 that are shipped; show oldest orders first" from the illustrative embodiment described above. However, unlike the first exemplary prompt 300, the second exemplary prompt 600 includes a more comprehensive schema rather than an unstructured data model, and includes examples in which the example structured outputs are expressed in SQL. The second exemplary preliminary structured request 610 can be output by an LLM in response to the second exemplary prompt 600.

The prompt 600 begins with an instruction to the LLM (i.e., "Based on the schema given below, you will create an sql statement for user's question . . . ") The instruction is followed by a schema, which includes a data model (i.e., the majority of the CREATE TABLE statement) along with a constraint for the STATUS_CODE attribute (i.e., "status_code ENUM ('New', 'In Process', 'Partially Shipped', 'Fully Shipped', 'Closed'"").

Similar to prompt 300, prompt 600 further includes a plurality of examples. As shown, each of the examples includes an example natural language request (i.e., the portion prefaced by "Question:") and a corresponding example structured request expressed in SQL (i.e., the portion prefaced by "Answer:"). In addition, as in prompt 300, the prompt 600 includes the natural language request from the illustrative embodiment at the end, prefaced by "Question:" and followed by "Answer:" (i.e., "Question: show all sales orders from last week with PT100 that are shipped; show oldest orders first. Answer:").

Similar to prompt 300, the prompt 600 includes functions in the examples; however, the functions are expressed in SQL. Accordingly, instead of translating "last week" and the information that today is 2023 Feb. 21 directly into a SQL statement, the task is split into an LLM part and a programmatic part. As a result, the second exemplary preliminary structured request 610 output by the LLM is as follows: "SELECT * FROM Objects WHERE product_id= "PT100" AND (status_code='Partially Shipped' OR status_code='Fully Shipped') AND created_at >= NOW( )—INTERVAL 1 WEEK ORDER BY created_at ASC;".

The post-processing module can then determine the actual value for the date programmatically. In addition, if the data processing engine which will ultimately receive the refined structured request uses a query language other than SQL, the post-processing module can translate the content of the preliminary structured request that is expressed in SQL to the query language used by the database. The translation can be performed by the post-processing module either before or after the date value is determined.

Use Cases

The technologies described herein can be applied in a variety of scenarios. For instance, as described herein, the types of natural language requests transformed via the disclosed techniques can include search requests as well as other types of requests such as OData requests and requests for generation of data models.

In addition to reducing cognitive load for an LLM via the techniques described herein, similar strategies can be performed to reduce the cognitive load for an LLM in the context of the RAG and fine-tuning methods described above.

Exemplary Implementations

Any of the following can be implemented.

Clause 1. A computer-implemented method comprising: receiving a natural language request; generating a prompt for a Large Language Model (LLM) based on the natural language request, wherein the prompt comprises a data model, one or more examples, and the natural language request, and wherein a given example of the one or more examples comprises an example natural language request and a corresponding example structured request, and wherein the example structured request comprises a call to a function; submitting the prompt to the LLM; receiving a preliminary structured request from the LLM in response to the prompt, wherein the preliminary structured request comprises a call to the function; post-processing the preliminary structured request, wherein post-processing the preliminary structured request comprises: executing the function; and generating a refined structured request, wherein generating the refined structured request comprises modifying the preliminary structured request based on an execution result of the function; and outputting the refined structured request.

Clause 2. The method of Clause 1, wherein generating the prompt comprises: selecting, from among a plurality of stored prompt templates, a prompt template comprising the data model and the one or more examples; and adding the natural language request to the prompt template.

Clause 3. The method of Clause 2, wherein: generating the prompt further comprises determining an object type relevant to the natural language request; and the prompt template is selected based on the object type.

Clause 4. The method of Clause 3, wherein: the prompt template further comprises one or more directives for the LLM.

Clause 5. The method of any one of Clauses 1-4, wherein the refined structured request is selected from the group consisting of: a search query; an OData request; and a request to generate a new data model.

Clause 6. The method of any one of Clauses 1-5, wherein the refined structured request is a search query, the method further comprising: querying a data processing engine with the refined structured request, wherein the refined structured request comprises one or more clauses; receiving a response to the refined structured request from the data processing engine, wherein the response comprises one or more structured objects that satisfy the one or more clauses of the refined structured request; and outputting the response to the refined structured request in response to the natural language request.

Clause 7. The method of any one of Clauses 1-6, further comprising, prior to receiving the natural language request: determining that a given data model comprises two or more attributes with names that include a common token; and adding an artificial attribute to the given data model, wherein a name of the artificial attribute is an abstraction of the names of the two or more attributes.

Clause 8. The method of any one of Clauses 1-7, wherein: the data model comprises a related attribute pair comprising a first attribute and a second attribute; possible values of the first attribute correspond to respective possible values of the second attribute; the one or more examples comprise a first example; the example natural language request of the first example comprises a token that potentially matches at least two candidate values of the second attribute; the example structured request of the first example comprises a clause that is satisfied for a given structured object when a value of the second attribute in the given structured object includes the token; and the example structured request of the first example does not comprise a clause that is satisfied for the given structured object when a value of the first attribute in the given structured object matches at least two candidate values of the first attribute that correspond to the at least two candidate values of the second attribute, respectively.

Clause 9. The method of any one of Clauses 1-8, wherein the preliminary structured request further comprises one or more parameters for the function and respective values of the one or more parameters.

Clause 10. The method of any one of Clauses 1-9, wherein the function is one of a plurality of functions included in the preliminary structured request.

Clause 11. The method of any one of Clauses 1-10, wherein: the one or more examples comprise respective example structured requests expressed in a first query language; and the preliminary structured request comprises content expressed in the first query language.

Clause 12. The method of Clause 11, wherein: the function comprises computer-executable instructions to translate the content expressed in the first query language into content expressed in a second query language; and modifying the preliminary structured request based on the execution result of the function comprises replacing the content expressed in the first query language with the content expressed in the second query language.

Clause 13. The method of Clause 12, further comprising: outputting the refined structured request to a data processing engine, wherein the first query language is a non-proprietary query language, and wherein the second query language is a proprietary query language used by the data processing engine.

Clause 14. The method of Clause 13, wherein the first query language is Structured Query Language (SQL).

Clause 15. The method of any one of Clauses 1-14, wherein the refined structured request is an OData request.

Clause 16. The method of any one of Clauses 1-15, wherein the refined structured request is a request to define a view definition for a data model.

Clause 17. A computing system comprising: at least one hardware processor; at least one memory coupled to the at least one hardware processor; a database comprising a plurality of stored prompt templates, wherein a given prompt template of the plurality of stored prompt templates comprises a data model and one or more examples, wherein a given example of the one or more examples comprises an example natural language request and a corresponding example structured request, and wherein the example structured request comprises a call to a function; and one or more non-transitory computer-readable media having stored therein computer-executable instructions that, when executed by the computing system, cause the computing system to perform: receiving a natural language request; generating a prompt for a Large Language Model (LLM) based on the natural language request, wherein generating the prompt comprises: determining an object type relevant to the natural language request; selecting a prompt template from among the plurality of stored prompt templates based on the object type; and populating the prompt template with the natural language request; submitting the prompt to the LLM; receiving a preliminary structured request from the LLM in response to the prompt, wherein the preliminary structured request comprises a call to a function; post-processing the preliminary structured request, wherein post-processing the preliminary structured request comprises: executing the function; and generating a refined structured request, wherein generating the refined structured request comprises modifying the preliminary structured request based on an execution result of the function; and outputting the refined structured request.

Clause 18. The system of Clause 17, wherein the example structured request of the given example further comprises one or more parameters for the function and respective values of the one or more parameters.

Clause 19. The system of Clause 17 or Clause 18, wherein: the example structured request of the given example further comprises content expressed in a first query language; the preliminary structured request received from the LLM comprises content expressed in the first query language; the function comprises computer-executable instructions to translate content of the preliminary structured request expressed in the first query language into content expressed in a second query language; and modifying the preliminary structured request based on the execution result of the function further comprises replacing the content expressed in the first query language with the content expressed in the second query language.

Clause 20. One or more non-transitory computer-readable media comprising computer-executable instructions that, when executed by a computing system, cause the computing system to perform operations comprising: receiving a natural language request; generating a prompt for a Large Language Model (LLM) based on the natural language request, wherein generating the prompt comprises: selecting, from among a plurality of stored prompt templates, a prompt template comprising a data model and one or more examples, wherein a given example of the one or more examples comprises an example natural language request and a corresponding example structured request comprising content expressed in a first query language; and populating the prompt template with the natural language request; submitting the prompt to the LLM; receiving a preliminary structured request from the LLM in response to the prompt, wherein the preliminary structured request comprises content expressed in the first query language and a call to a function, and wherein the function comprises computer-executable instructions to translate the content expressed in the first query language into content expressed in a second query language; post-processing the preliminary structured request, wherein post-processing the preliminary structured request comprises: executing the function, wherein executing the function comprises translating the content expressed in the first query language into content expressed in the second query language; and generating a refined structured request, wherein generating the refined structured request comprises modifying the preliminary structured request by replacing the content expressed in the first query language with the content expressed in the second query language; and outputting the refined structured request.

Exemplary Computing Systems

Figure 7:
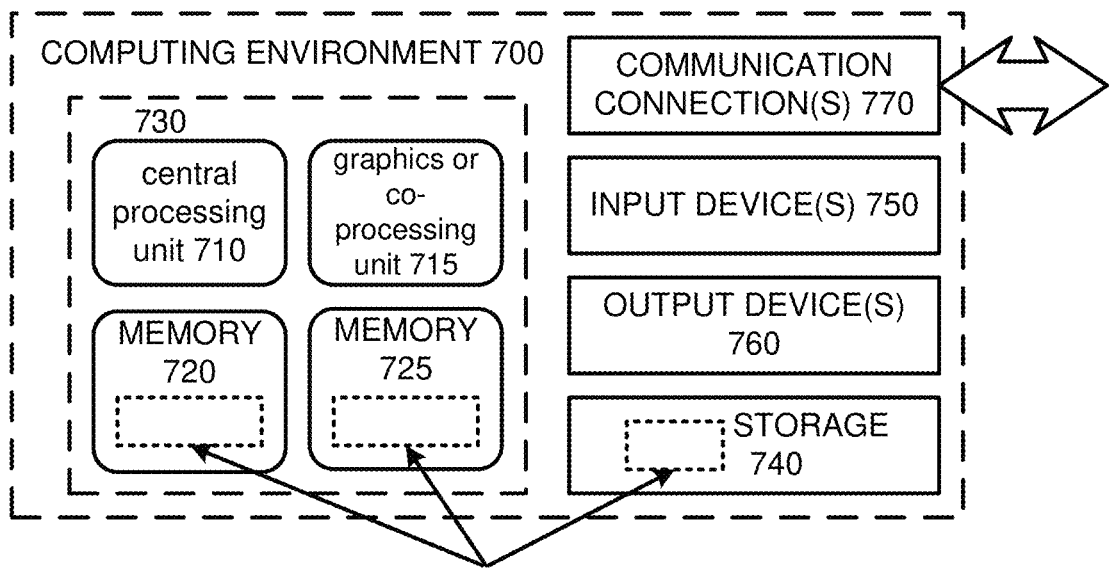
FIG. 7 is a block diagram of an exemplary computing system in which described embodiments can be implemented.

FIG. 7 depicts an exemplary suitable computing system 700 in which the described innovations can be implemented. The computing system 700 is not intended to suggest any limitation as to scope of use or functionality of the present disclosure, as the innovations can be implemented in diverse computing systems.

With reference to FIG. 7, the computing system 700 includes one or more processing units 710, 715 and memory 720, 725. In FIG. 7, this basic configuration 730 is included within a dashed line. The processing units 710, 715 execute computer-executable instructions, such as for implementing the features described herein. A processing unit can be a general-purpose central processing unit (CPU), processor in an application-specific integrated circuit (ASIC), or any other type of processor. In a multi-processing system, multiple processing units execute computer-executable instructions to increase processing power. For instance, FIG. 7 shows a central processing unit 710 as well as a graphics processing unit or co-processing unit 715. The tangible memory 720, 725 can be volatile memory (e.g., registers, cache, RAM), non-volatile memory (e.g., ROM, EEPROM, flash memory, etc.), or some combination of the two, accessible by the processing unit(s) 710, 715. The memory 720, 725 stores software 780 implementing one or more innovations described herein, in the form of computer-executable instructions suitable for execution by the processing unit(s) 710, 715.

A computing system 700 can have additional features. For instance, the computing system 700 includes storage 740, one or more input devices 750, one or more output devices 760, and one or more communication connections 770, including input devices, output devices, and communication connections for interacting with a user. An interconnection mechanism (not shown) such as a bus, controller, or network interconnects the components of the computing system 700. Typically, operating system software (not shown) provides an operating environment for other software executing in the computing system 700, and coordinates activities of the components of the computing system 700.

The tangible storage 740 can be removable or non-removable, and includes magnetic disks, magnetic tapes or cassettes, CD-ROMs, DVDs, or any other medium which can be used to store information in a non-transitory way and which can be accessed within the computing system 700. The storage 740 stores instructions for the software 780 implementing one or more innovations described herein.

The input device(s) 750 can be an input device such as a keyboard, mouse, pen, or trackball, a voice input device, a scanning device, touch device (e.g., touchpad, display, or the like) or another device that provides input to the computing system 700. The output device(s) 760 can be a display, printer, speaker, CD-writer, or another device that provides output from the computing system 700.

The communication connection(s) 770 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. For exemplary purposes, and not as a limitation, communication media can use an electrical, optical, RF, or other carrier.

The innovations can be described in the context of computer-executable instructions, such as those included in program modules, being executed in a computing system on a target real or virtual processor (e.g., which is ultimately executed on one or more hardware processors). Generally, program modules or components include routines, programs, libraries, objects, classes, components, data structures, etc. that perform particular tasks or implement particular abstract data types. The functionality of the program modules can be combined or split between program modules as desired in various embodiments. Computer-executable instructions for program modules can be executed within a local or distributed computing system.

For the sake of presentation, the detailed description uses terms like "determine" and "use" to describe computer operations in a computing system. These terms are high-level descriptions for operations performed by a computer and should not be confused with acts performed by a human being. The actual computer operations corresponding to these terms vary depending on implementation.

Exemplary Computer-Readable Media

Any of the computer-readable media herein can be non-transitory (e.g., volatile memory such as DRAM or SRAM, nonvolatile memory such as magnetic storage, optical storage, or the like) and/or tangible. Any of the storing actions described herein can be implemented by storing in one or more computer-readable media (e.g., computer-readable storage media or other tangible media). Any of the things (e.g., data created and used during implementation) described as stored can be stored in one or more computer-readable media (e.g., computer-readable storage media or other tangible media). Computer-readable media can be limited to implementations not consisting of a signal.

Any of the methods described herein can be implemented by computer-executable instructions in (e.g., stored on, encoded on, or the like) one or more computer-readable media (e.g., computer-readable storage media or other tangible media) or one or more computer-readable storage devices (e.g., memory, magnetic storage, optical storage, or the like). Such instructions can cause a computing system to perform the method. The technologies described herein can be implemented in a variety of programming languages.

Exemplary Cloud Computing Environment

Figure 8:
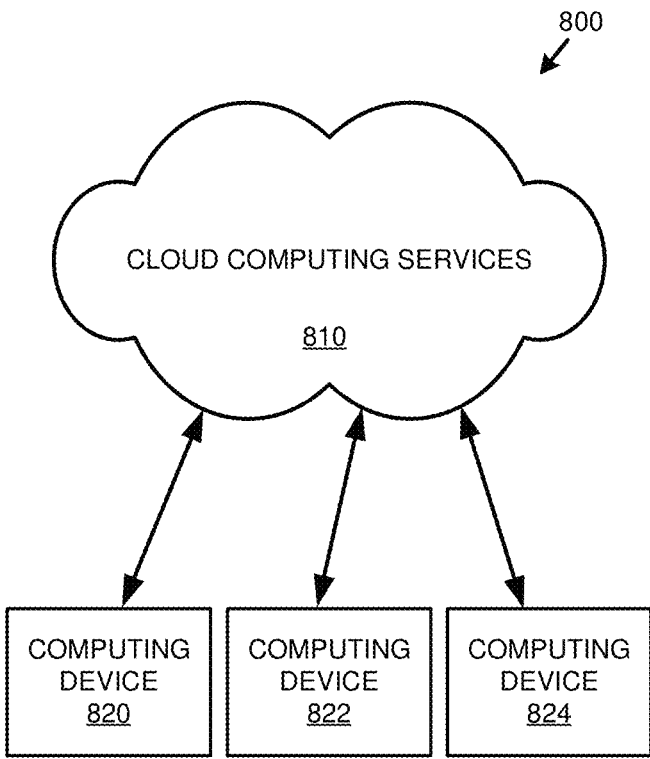
FIG. 8 is a block diagram of an exemplary cloud computing environment that can be used in conjunction with the technologies described herein.

FIG. 8 depicts an exemplary cloud computing environment 800 in which the described technologies can be implemented, including, e.g., the system 100 of FIG. 1 and other systems herein. The cloud computing environment 800 comprises cloud computing services 810. The cloud computing services 810 can comprise various types of cloud computing resources, such as computer servers, data storage repositories, networking resources, etc. The cloud computing services 810 can be centrally located (e.g., provided by a data center of a business or organization) or distributed (e.g., provided by various computing resources located at different locations, such as different data centers and/or located in different cities or countries).

The cloud computing services 810 are utilized by various types of computing devices (e.g., client computing devices), such as computing devices 820, 822, and 824. For instance, the computing devices (e.g., 820, 822, and 824) can be computers (e.g., desktop or laptop computers), mobile devices (e.g., tablet computers or smart phones), or other types of computing devices. For instance, the computing devices (e.g., 820, 822, and 824) can utilize the cloud computing services 810 to perform computing operations (e.g., data processing, data storage, and the like).

In practice, cloud-based, on-premises-based, or hybrid scenarios can be supported.

Exemplary Implementations

Although the operations of some of the disclosed methods are described in a particular, sequential order for convenient presentation, such manner of description encompasses rearrangement, unless a particular ordering is required by specific language set forth herein. For instance, operations described sequentially can in some cases be rearranged or performed concurrently.

Exemplary Alternatives

The technologies from any embodiment can be combined with the technologies described in any one or more of the other embodiments. In view of the many possible embodiments to which the principles of the disclosed technology can be applied, it should be recognized that the illustrated embodiments exemplify the disclosed technology and should not be taken as a limitation on the scope of the disclosed technology. Rather, the scope of the disclosed technology includes what is covered by the scope and spirit of the following claims.

What is claimed is:

1. A computer-implemented method comprising:
   receiving, by a prompt generation module, a natural language request;
   generating, by the prompt generation module, a prompt for a Large Language Model (LLM) based on the natural language request, wherein the prompt comprises a data model defined in a data processing engine, one or more examples defined in a prompt generation database, and the natural language request, and wherein a given example of the one or more examples comprises an example natural language request and a corresponding example structured request, and wherein the example structured request comprises a call to a function corresponding to a sub-task to be performed programmatically;
   submitting, by the prompt generation module, the prompt to the LLM;
   receiving, by a post-processing module, a preliminary structured request from the LLM generated in response to the prompt, wherein the preliminary structured request comprises the call to the function;
   post-processing the preliminary structured request, by the post-processing module, wherein post-processing the preliminary structured request comprises:
      retrieving computer-executable code of the function from the prompt generation database;
      executing the computer-executable code of the function; and
      generating a refined structured request, wherein generating the refined structured request comprises modifying the preliminary structured request based on an execution result of the function, wherein the modifying comprises inserting the execution result of the function into the preliminary structured request;
   outputting the refined structured request to the data processing engine; and
   generating, by the data processing engine, a response to the natural language request using the refined structured request.

2. The method of claim 1, wherein generating the prompt comprises:
   selecting, from a plurality of stored prompt templates, a prompt template comprising the data model and the one or more examples; and
   adding the natural language request to the prompt template.

3. The method of claim 2, wherein:
   generating the prompt further comprises determining an object type relevant to the natural language request; and
   the prompt template is selected based on the object type.

4. The method of claim 3, wherein:
   the prompt template further comprises one or more directives for the LLM.

5. The method of claim 1, wherein the refined structured request is selected from the group consisting of:
   a search query;
   an OData request; and
   a request to generate a new data model.

6. The method of claim 1, wherein the refined structured request is a search query, the method further comprising:
   querying the data processing engine with the refined structured request, wherein the refined structured request comprises one or more clauses;
   wherein the response to the natural language request comprises one or more structured objects that satisfy the one or more clauses of the refined structured request.

7. The method of claim 1, further comprising, prior to receiving the natural language request:
   determining that a given data model comprises two or more attributes with names that include a common token; and
   adding an artificial attribute to the given data model, wherein a name of the artificial attribute is an abstraction of the names of the two or more attributes.

8. The method of claim 1, wherein:

the data model comprises a related attribute pair compris-
ing a first attribute and a second attribute;

possible values of the first attribute correspond to respec-
tive possible values of the second attribute;

the one or more examples comprise a first example;

the example natural language request of the first example
comprises a token that potentially matches at least two
candidate values of the second attribute;

the example structured request of the first example com-
prises a clause that is satisfied for a given structured
object when a value of the second attribute in the given
structured object includes the token; and the example structured request of the first example does
not comprise a clause that is satisfied for the given
structured object when a value of the first attribute in
the given structured object matches at least two candi-
date values of the first attribute that correspond to the
at least two candidate values of the second attribute,
respectively.

9. The method of claim 1, wherein the preliminary struc-
tured request further comprises one or more parameters for
the function and respective values of the one or more
parameters.

10. The method of claim 1, wherein the function is one of
a plurality of functions included in the preliminary struc-
tured request.

11. The method of claim 1, wherein:

the one or more examples comprise respective example
structured requests expressed in a first query language;
and the preliminary structured request comprises content
expressed in the first query language.

12. The method of claim 11, wherein:

the computer-executable code of the function is config-
ured to translate the content expressed in the first query
language into content expressed in a second query
language; and modifying the preliminary structured request based on the
execution result of the function comprises replacing the
content expressed in the first query language with the
content expressed in the second query language.

13. The method of claim 12, wherein the first query language is a non-proprietary
query language, and wherein the second query language is a proprietary query
language used by the data processing engine.

14. The method of claim 13, wherein the first query
language is Structured Query Language (SQL).

15. The method of claim 1, wherein the refined structured
request is an OData request.

16. The method of claim 1, wherein the refined structured
request is a request to define a view definition for a data
model.

17. A computing system comprising:

at least one hardware processor;

at least one memory coupled to the at least one hardware
processor;

a prompt generation database comprising a plurality of
stored prompt templates, wherein a given prompt tem-
plate of the plurality of stored prompt templates com-
prises a data model defined in a data processing engine
and one or more examples defined in the prompt
generation database, wherein a given example of the
one or more examples comprises an example natural
language request and a corresponding example struc-
tured request, and wherein the example structured request comprises a call to a function corresponding to
a sub-task to be performed programmatically; and one or more non-transitory computer-readable media hav-
ing stored therein computer-executable instructions
that, when executed by the computing system, cause
the computing system to perform:

receiving, by a prompt generation module, a natural
language request;

generating, by the prompt generation module, a prompt
for a Large Language Model (LLM) based on the
natural language request, wherein generating the
prompt comprises:

determining an object type relevant to the natural
language request;

selecting a prompt template from the plurality of
stored prompt templates based on the object type;
and populating the prompt template with the natural
language request;

submitting, by the prompt generation module, the
prompt to the LLM;

receiving, by a post-processing module, a preliminary
structured request from the LLM generated in
response to the prompt, wherein the preliminary
structured request comprises the call to the function;

post-processing the preliminary structured request, by
the post-processing module, wherein post-process-
ing the preliminary structured request comprises:

retrieving computer-executable code of the function
from the prompt generation database;

executing the computer-executable code of the func-
tion; and generating a refined structured request, wherein gen-
erating the refined structured request comprises
modifying the preliminary structured request
based on an execution result of the function,
wherein the modifying comprises inserting the
execution result of the function into the prelimi-
nary structured request;

outputting the refined structured request to the data
processing engine; and generating, by the data processing engine, a response to
the natural language request using the refined struc-
tured request.

18. The system of claim 17, wherein the example struc-
tured request of the given example further comprises one or
more parameters for the function and respective values of
the one or more parameters.

19. The system of claim 17, wherein:

the example structured request of the given example
further comprises content expressed in a first query
language;

the preliminary structured request received from the LLM
comprises content expressed in the first query lan-
guage;

the computer-executable code of the function is config-
ured to translate content of the preliminary structured
request expressed in the first query language into
content expressed in a second query language; and modifying the preliminary structured request based on the
execution result of the function further comprises
replacing the content expressed in the first query lan-
guage with the content expressed in the second query
language.

20. One or more non-transitory computer-readable media
comprising computer-executable instructions that, when executed by a computing system, cause the computing system to perform operations comprising:

receiving, by a prompt generation module, a natural language request;

generating, by the prompt generation module, a prompt for a Large Language Model (LLM) based on the natural language request, wherein generating the prompt comprises:

selecting, from a plurality of prompt templates stored in a prompt generation database, a prompt template comprising a data model defined in a data processing engine and one or more examples defined in the prompt generation database, wherein a given example of the one or more examples comprises an example natural language request and a corresponding example structured request comprising content expressed in a first query language; and populating the prompt template with the natural language request;

submitting, by the prompt generation module, the prompt to the LLM;

receiving, by a post-processing module, a preliminary structured request from the LLM generated in response to the prompt, wherein the preliminary structured request comprises content expressed in the first query language and a call to a function corresponding to a sub-task to be performed programmatically;

post-processing the preliminary structured request, wherein post-processing the preliminary structured request comprises:

retrieving computer-executable code of the function from the prompt generation database;

executing the computer-executable code of the function, wherein the executing comprises translating the content expressed in the first query language into content expressed in a second query language; and generating a refined structured request, wherein generating the refined structured request comprises modifying the preliminary structured request, comprising:

replacing the content expressed in the first query language with the content expressed in the second query language, and inserting an execution result of the function into the preliminary structured request;

outputting the refined structured request to the data processing engine; and generating, by the data processing engine, a response to the natural language request using the refined structured request.

\* \* \* \* \*